E. J. OSTER.
TRANSMISSION MECHANISM.
APPLICATION FILED MAY 29, 1918.
1,297,397.
Patented Mar. 18, 1919.
2 SHEETS—SHEET 2.
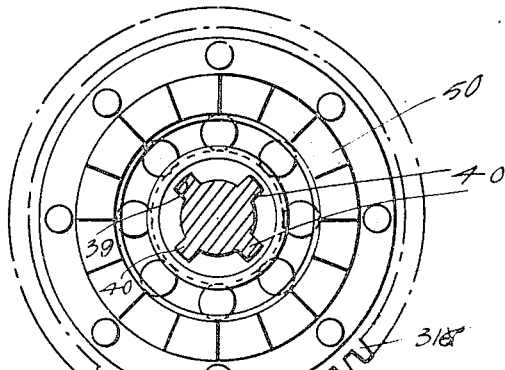
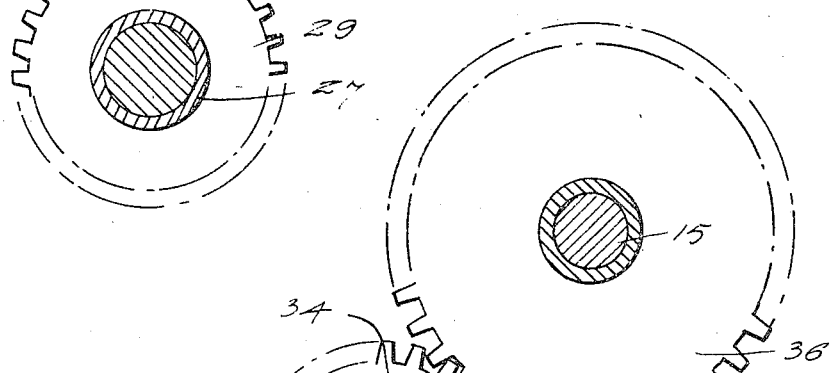
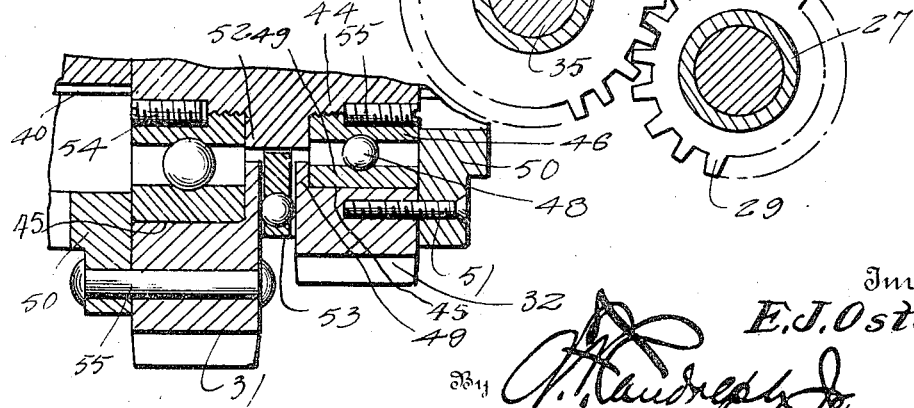
Inventor
E. J. Oster
By
Attorney

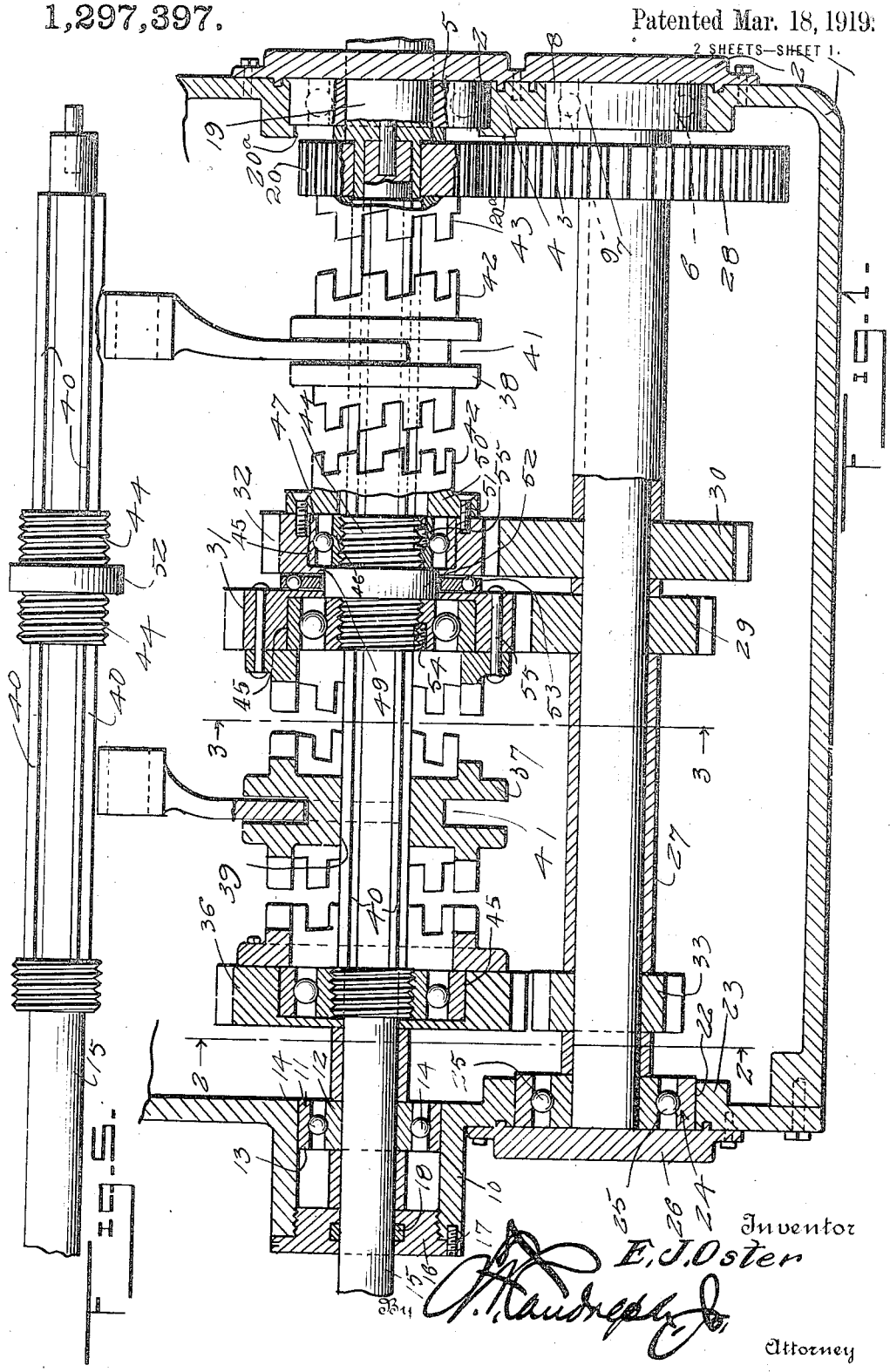

UNITED STATES PATENT OFFICE.

EDWARD J. OSTER, OF COLD SPRING, MINNESOTA.

TRANSMISSION MECHANISM.

1,297,397.  Specification of Letters Patent.  Patented Mar. 18, 1919.

Application filed May 29, 1918. Serial No. 237,262.

*To all whom it may concern:*

Be it known that I, EDWARD J. OSTER, a citizen of the United States, residing at Cold Spring, in the county of Stearns and State of Minnesota, have invented certain new and useful Improvements in Transmission Mechanism; and I do hereby declare the following to be a full, clear, and exact description of the invention, such as will enable others skilled in the art to which it appertains to make and use the same.

This invention relates to improvements in transmission, and has for one of its objects the provision of a device of this character wherein the speed changing gears are at all times in mesh with each other, obviating the wear on gears when it is necessary to mesh and unmesh them in obtaining various speeds in well known forms of transmission, and also provides a comparatively noiseless device, as the noise created by the gears disengaging and engaging each other is entirely obviated.

Another object of this invention is the provision of clutch mechanisms for establishing driving connection between the driven shaft and the floating gears that are in mesh with the speed changing gears.

A further object of this invention is the provision of means for mounting the floating gears on the driven shaft, so that there will be a minimum amount of friction between them and the driven shaft when said gears are moving free of the driven shaft.

A still further object of this invention is the provision of a transmission mechanism of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts, as will be hereinafter more fully described and claimed.

For a complete understanding of my invention, reference will be had to the following description and accompanying drawings, in which:

Figure 1 is a vertical sectional view of a transmission mechanism constructed in accordance with my invention, Fig. 2 is a transverse sectional view, taken on the line 2—2 of Fig. 1, Fig. 3 is a similar view, taken on the line 3—3 of Fig. 1, Fig. 4 is a fragmentary sectional view, illustrating the manner of mounting gears upon the driven shaft, and Fig. 5 is a side elevation of the driven shaft.

Referring in detail to the drawings, the numeral 1 indicates a casing having at one of its ends a pair of openings 2 and 3, which are surrounded by enlarged portions 4 adapted to support bearings 5 and 6 within said openings. The bearings 5 and 6 each consist of inner and outer sections 7 and 8 that are of annular form and having their opposing faces grooved to receive ball bearings 9, so that the inner sections may rotate freely with relation to the outer section with a minimum amount of friction. The other end of the casing has formed thereon a cylindrical extension 10 in alinement with the opening 2 in which is positioned a bearing 11 consisting of inner and outer sections 12 and 13 between which is positioned ball bearings 14. The inner section 12 is secured to a driven shaft 15, which extends through the cylindrical portion 10 into the casing 1, and has mounted thereon a closure cap 16, which is threaded to the cylindrical portion 10 and further secured thereto by set screws 17. The closure cap 16 is provided with a suitable packing groove, in which is positioned packing 18, which engages the driven shaft 15 to establish a leak-proof connection between the closure cap and the driven shaft. The driven shaft extends through the casing 1 to a point adjacent the opening 2, and has its free end disposed adjacent to a drive shaft 19 secured to the inner section 7 of the bearing 5. The main shaft 19 is adapted to have its outer end connected to a power source not shown, while its inner end has secured thereto a main shaft gear 20, located within the housing 1. A closure plate 21 is provided with an opening to receive the shaft 19, and is secured over the openings 2 and 3 for holding the bearings 5 and 6 in their proper positions. The enlarged portion 4 is provided with an annular flange 20ª, which coöperates with the closure plate 21 in retaining the bearing 5 in its proper position. The casing 1 has an opening 22 directly under the cylindrical portion 10 surrounded by an enlarged portion 23 on which is positioned a bearing 24, consisting of inner and outer sections between which are interposed ball bearings 25. A closure cap 26 is secured over the opening 22 for retaining the bearing 24 within its proper position. The inner section of the bearing 24 has secured thereto one end of a jack or counter shaft 27, while the opposite end of said shaft is secured to the inner section 7 of the bearing 6. A drive gear 28 is fixed to one end of the counter or jack shaft 27, and is in mesh with the main shaft gear, whereby the counter or jack shaft is driven by the main shaft. Low and intermediate gears 29 and 30 are secured to the counter or jack shaft, and are in mesh with low and intermediate floating gears 31 and 32, respectively, carried by the driven shaft 15. A reversing gear 33 is secured to the counter or jack shaft 27, and meshes with an idle gear 34 journaled on a stub shaft 35 secured to the casing 1. The idle gear meshes with a reverse floating gear 36 journaled upon the driven shaft 15.

Shifting claws 37 and 38 are located upon the driven shaft between the intermediate floating gear and main shaft gear and the reverse floating gear and the low floating gear, as clearly illustrated in the drawings. The shifting claws 37 and 38 are provided with a plurality of grooves 39 for receiving longitudinally extending ribs 40 formed upon the driven shaft 15, whereby the shifting claws are locked for rotation with the drive shaft, but are free to have sliding movement longitudinally thereof. The shifting claws are each provided with a groove 41 to receive the shifting forks of an ordinary construction, and which are connected to ordinary shifting levers not shown. Clutch teeth 42 are formed upon the shifting claws and coöperate with clutch teeth 43 secured to the gears 20, 31, 32 and 36, whereby when shifting the claw 38 so that the clutch teeth 42 upon one side thereof engage the clutch teeth 43 upon the main shifting gear 20, a direct drive will be obtained between the drive shaft 19 and the driven shaft 15. By shifting the claw 38 in an opposite direction, the teeth thereof mesh with the teeth upon the intermediate floating gear 32, thereby obtaining second or intermediate speed to the transmission. By shifting the claw 37 in one direction, the teeth upon one side thereof mesh with the teeth carried by the low floating gear, thus locking the low floating gear to the driven shaft obtaining low speed to the transmission by way of the main shaft through the gears 20 and 28, counter or jack shaft, low gear 29, low floating gear 31 of the shifting claw 37. By moving the shifting claw 37 in an opposite direction, reverse speed is obtained by the teeth thereon meshing with the teeth upon the reverse floating gear, which is in mesh with the idle gear 34, which is in turn in mesh with the reverse gear 33 carried by the counter or jack shaft 27.

The manner of mounting, and the construction of the floating gears 31 and 32 and 36 are identical and reference to one is thought sufficient for all. The driven shaft 15 is provided with enlarged screw threaded portions 44 at points where the floating gears are mounted thereon. A bearing 45, consisting of inner and outer sections 46 and 47, has positioned therebetween ball bearings 48. The inner section 46 is screw threaded for coöperating with the screw threads upon the enlarged portion 44 of the driven shaft 15. The floating gear consists of a circular body having an opening to receive the bearings 45. The outer section 47 is in frictional engagement with the wall of the opening in the body of the floating gear and is limited in movement in one direction by means of an annular flange 49 formed upon the body, while it is limited in its opposite direction by a member 50 on which the clutch teeth 42 are formed. The member 50 overlies each of the sections 46 and 47 of the bearing 45, and is secured to the body of the floating gear by means of set screws 51, thus it will be seen that the floating gear may turn freely on the driven shaft 15 with a minimum amount of friction when said gear is not being employed to drive said driven shaft.

The enlarged portion 44, which supports the lower and intermediate floating gears, is of an increased length and has formed thereon an increased annular portion 52 on which is mounted a thrust bearing 53. This thrust bearing is adapted to take up end thrust between the lower and intermediate floating gears.

The inner section 46 of the bearing 45 that supports the low floating gear is locked to the enlarged portion 44 of the driven shaft 15 by means of a set screw 55, and the member 50 is secured to the body of the low floating gear by means of rivets 55. To remove the low floating gear from the enlarged portion 44, it is only necessary that the set screw 55 be removed and the bearing 45 threaded off the enlarged portion. The bearing 45 of the intermediate floating gear is also secured to the enlarged portion 44 by means of a set screw 54.

While I have shown and described the preferred embodiment of my invention, it will be understood that minor changes in construction, combination and arrangement of parts may be made without departing from the spirit and scope of the invention as claimed.

Having thus described my invention, what I claim is:

A transmission mechanism including a casing, a drive shaft journaled in said casing, a driven shaft journaled in said casing, a jack shaft journaled in said casing, means establishing driving connection between the drive shaft and the jack shaft, speed changing gears secured to the jack shaft, anti-friction bearings mounted upon the driven shaft, floating gears mounted upon said anti-friction bearings, a thrust bearing interposed between a pair of floating gears and journaled upon the driven shaft, and means locking any one of the floating gears to the driven shaft.

In testimony whereof I affix my signature in presence of two witnesses.

EDWARD J. OSTER.

Witnesses:
JAMES R. BENNETT, Jr.
JOHN OSTER.